US010277422B2

(12) United States Patent
Chippa et al.

(10) Patent No.: US 10,277,422 B2
(45) Date of Patent: Apr. 30, 2019

(54) VIRTUAL PORT SUPPORT IN A LOGICAL SWITCH ARCHITECTURE

(71) Applicant: International Business Machines Corporation, Armonk, NY (US)

(72) Inventors: Ashok N. Chippa, Mountain View, CA (US); Ioana M. Costea, San Jose, CA (US); Vipin K. Garg, Sunnyvale, CA (US); Sze W. Lao, Fremont, CA (US); Dar-Ren Leu, San Jose, CA (US); Nilanjan Mukherjee, Santa Clara, CA (US); Vijoy A. Pandey, San Jose, CA (US); Daljeet Singh, Watsonville, CA (US); Ethan M. Spiegel, Mountain View, CA (US); Robert E. Zagst, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 14/270,834

(22) Filed: May 6, 2014

(65) Prior Publication Data
US 2015/0326506 A1 Nov. 12, 2015

(51) Int. Cl.
| G06F 15/173 | (2006.01) |
| H04L 12/64 | (2006.01) |
| H04L 12/931 | (2013.01) |
| H04L 12/24 | (2006.01) |
| H04L 29/08 | (2006.01) |

(52) U.S. Cl.
CPC .......... *H04L 12/6418* (2013.01); *H04L 29/08* (2013.01); *H04L 41/00* (2013.01); *H04L 41/5054* (2013.01); *H04L 49/354* (2013.01); *H04L 67/10* (2013.01)

(58) Field of Classification Search
CPC ... H04L 45/00; H04L 45/586; H04L 12/4641; H04L 45/60; G06F 9/45533
See application file for complete search history.

(56) References Cited

U.S. PATENT DOCUMENTS

| 5,550,816 A * | 8/1996 | Hardwick | H04L 12/4604 370/397 |
| 2002/0038419 A1 * | 3/2002 | Garrett | H04L 12/2801 713/154 |
| 2009/0144393 A1 * | 6/2009 | Kudo | G06F 9/5044 709/218 |
| 2011/0078334 A1 | 3/2011 | Arakawa et al. | |

(Continued)

*Primary Examiner* — Hitesh Patel
(74) *Attorney, Agent, or Firm* — Zilka-Kotab, P.C.

(57) ABSTRACT

A tool for assigning virtual port channels to one or more logical switch routers in a distributed system. The tool receives, by one or more computer processors, a request to assign a virtual port channel to a second logical switch router. The tool sends, by one or more computer processors, a request to negotiate a link-down on the channel on a first logical switch router to a universal fiber port on the first logical switch router for processing. The tool sends, by one or more computer processors, a request to create the channel on the second logical switch router to a second interface manager on the second logical switch router for processing. The tool sends, by one or more computer processors, a request to negotiate a link up on the channel on the second logical switch router to the universal fiber port on the first logical switch router for processing.

19 Claims, 8 Drawing Sheets

(56) References Cited

U.S. PATENT DOCUMENTS

| | | | |
|---|---|---|---|
| 2011/0161489 A1* | 6/2011 | Bhatt | H04L 45/245 709/224 |
| 2012/0039331 A1* | 2/2012 | Astigarraga | H04L 45/26 370/389 |
| 2012/0147894 A1* | 6/2012 | Mulligan | G06F 9/45533 370/395.53 |
| 2012/0271925 A1 | 10/2012 | Miller et al. | |
| 2013/0132531 A1* | 5/2013 | Koponen | H04L 41/0823 709/220 |
| 2013/0227153 A1* | 8/2013 | Zurmuehl | G06F 9/5055 709/228 |
| 2014/0123135 A1* | 5/2014 | Huang | H04L 41/5054 718/1 |
| 2014/0241353 A1* | 8/2014 | Zhang | H04L 45/74 370/390 |
| 2015/0003453 A1* | 1/2015 | Sengupta | H04L 45/74 370/392 |
| 2015/0043378 A1* | 2/2015 | Bardgett | H04L 12/4641 370/254 |
| 2015/0052524 A1* | 2/2015 | Raghu | G06F 9/455 718/1 |
| 2015/0103838 A1* | 4/2015 | Zhang | H04L 45/04 370/401 |
| 2015/0156071 A1* | 6/2015 | Adolphson | H04L 45/02 370/254 |
| 2015/0188770 A1* | 7/2015 | Naiksatam | H04L 41/0893 370/254 |
| 2015/0263946 A1* | 9/2015 | Tubaltsev | H04L 45/74 370/392 |
| 2017/0324826 A1* | 11/2017 | Johnsen | G11C 15/00 |
| 2017/0324848 A1* | 11/2017 | Johnsen | H04L 12/1886 |

\* cited by examiner

VIRTUAL PORT SUPPORT IN A LOGICAL SWITCH ARCHITECTURE

FIELD OF THE INVENTION

The present invention relates generally to network virtualization, and more particularly to virtual port support in a logical switch architecture.

BACKGROUND OF THE INVENTION

In computing, network virtualization is a method used to combine hardware and software network resources and network functionality into a single, software based administrative platform, known as a virtual network. Network virtualization is achieved through software and services that allow the sharing of storage, bandwidth, applications, and other network resources. The technology utilizes a method similar to the virtualization process used to simulate virtual machines within physical computers (i.e., server virtualization). A virtual network treats all hardware and software in the network as a single collection of resources, which can be accessed regardless of physical boundaries. In simple terms, network virtualization allows each authorized user to share network resources from a single computer.

Network virtualization facilitates customization and ease of network use. Virtualization can provide customized access that allows administrators to allocate critical network services, such as bandwidth throttling and quality of service (QoS). It can also provide consolidation by allowing a multitude of physical networks to be combined into a single virtual network, allowing for streamlined and simplified management.

One way to achieve network virtualization is to provide logical switch illusions on a physical switch. Currently, only physical ports can be allocated to different logical switch routers (LSRs).

SUMMARY

Aspects of the present invention provide a method, system, and computer program product for assigning virtual port channels to one or more logical switch routers in a distributed system. The method includes receiving, by one or more computer processors, a request to assign a virtual port channel to a second logical switch router. The method includes sending, by one or more computer processors, a request to negotiate a link down on the channel on a first logical switch router to a universal fiber port on the first logical switch router for processing. The method includes sending, by one or more computer processors, a request to delete the channel on the first logical switch router to a first interface manager on the first logical switch router for processing. The method includes sending, by one or more computer processors, a request to create the channel on the second logical switch router to a second interface manager on the second logical switch router for processing. The method includes sending, by one or more computer processors, a request to negotiate a link up on the channel on the second logical switch router to the universal fiber port on the first logical switch router for processing.

DETAILED DESCRIPTION

Embodiments of the present invention provide the capability to support vport assignment to one or more LSRs (i.e., different LSRs) by coordinating interactions between a plurality of software modules in a LSR system to manage and negotiate vport assignment.

Implementation of such embodiments may take a variety of forms, and exemplary implementation details are discussed subsequently with reference to the Figures.

The present invention may be a system, a method, and/or a computer program product. The computer program product may include a computer-readable storage medium (or media) having computer-readable program instructions thereon for causing a processor to carry out aspects of the present invention.

The computer-readable storage medium can be any tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
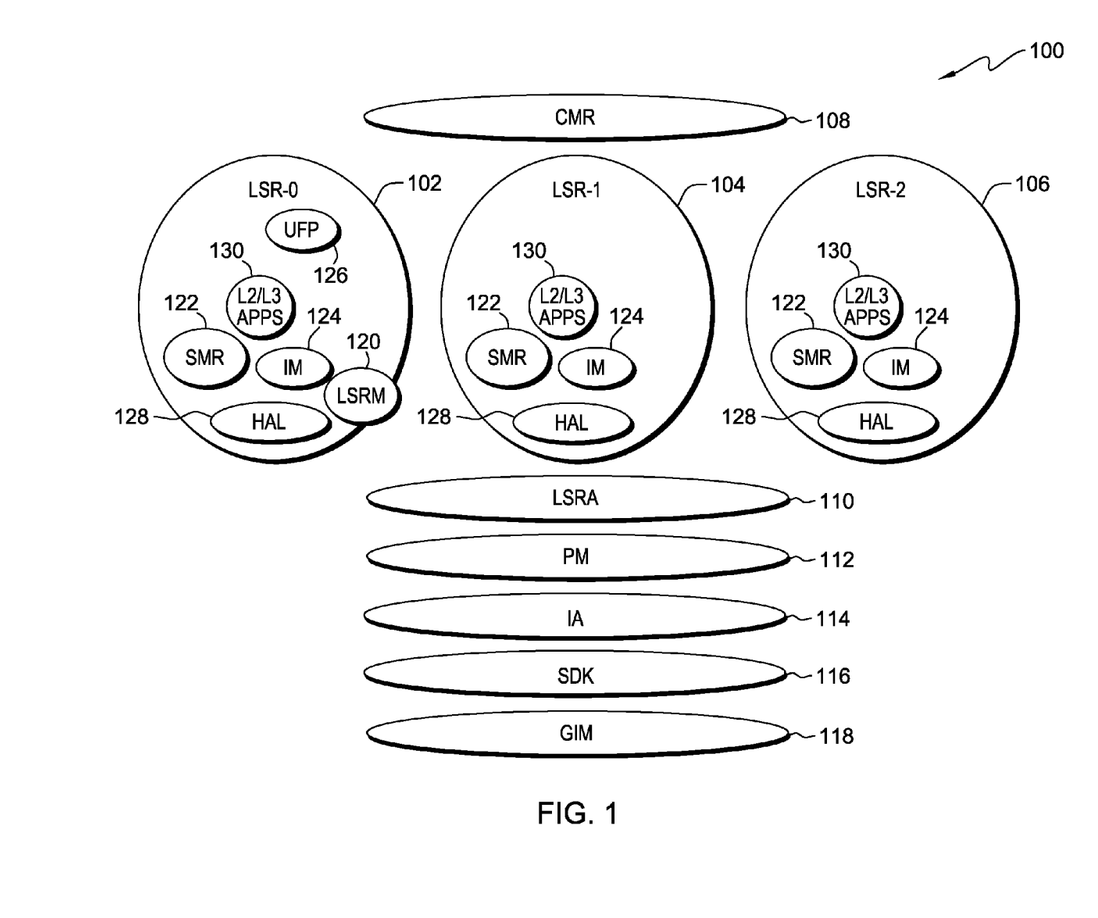
FIG. 1 illustrates a logical switch router (LSR) architecture within a data processing system, generally designated 100, in accordance with an embodiment of the present invention.

The present invention will now be described in detail with reference to Figures. FIG. 1 illustrates a logical switch router (LSR) architecture within a data processing system, generally designated 100, including a default logical switch router (LSR-0) 102, multiple non-default logical switch routers (LSR-1, LSR-2, etc.), such as LSR-1 104 and LSR-2 106, a configuration, management, and reporting client (CMR) 108, a logical switch router agent (LSRA) 110, a port manager (PM) 112, an interface agent (IA) 114, a software development kit (SDK) 116, a global index manager (GIM) 118, and a logical switch router manager (LSRM) 120.

In the exemplary embodiment, LSR-0 102 is an administrative logical switch router initially created by the networking system. LSR-0 102 cannot be deleted, and is responsible for managing non-default logical switch routers, such as LSR-1 104 and LSR-2 106. In the exemplary embodiment, the LSR environment is port/virtual port (vport) based, such that each port/vport can belong to only one LSR. All physical ports belong to LSR-0 102 until assigned to one or more non-default logical switch routers, such as LSR-1 104 and LSR-2 106. Initially, vports will not be present in the LSR environment. Vports are created by user configuration or via protocol negotiation.

In the exemplary embodiment, LSR-0 102 includes LSRM 120, a key process, operating on the master (as well as the backup) switch, responsible for LSR management, including hardware resource (e.g., port) assignment and management, a service manager (SMR) 122, a software module responsible for launch and monitoring of software processes, CMR 108, a command line interface responsible for user management of LSRs and processing user requests, an interface manager (IM) 124, a universal fiber port (UFP) 126, a hardware abstraction layer (HAL) 128, and L2 and L3 level applications (apps) 130. On the data plane, there is no direct communication between two LSRs on the same switch. Communication between two LSRs on the same switch is possible through external connectivity.

In the exemplary embodiment, SMR 122 is one instance per LSR. SMR 122 launches all software processes with each LSR via a configuration file associated with each process (e.g., application). In each LSR, processes can be launched automatically or launched by user configuration, i.e., CMR 108 signals SMR 122 when a user request is issued. SMR 122 launches processes as defined by the configuration file associated with the process. For example, if a process is implemented in a distributed way, and is launched per user configuration, SMR 122 sends the request to all other switches to launch the process in a particular LSR. Policies for monitoring and restart are defined per process.

In the exemplary embodiment, IM 124 is a software module capable of handling logical interface (LIF) related management. A LIF can represent a physical interface, a virtual interface, a port-channel, a routed virtual interface (RVI), a loopback, etc. A LIF database in shared memory (not shown) is maintained in IM 124. In the exemplary embodiment, one instance of IM 124 operates within each LSR in the LSR environment (i.e., distributed system).

In the exemplary embodiment, UFP 126 is a universal arbitrated fiber port used to communicate with and connect to ports or other devices included within the distributed system.

In the exemplary embodiment, HAL 128 is a software module responsible for hardware programming in the LSR environment. HAL 128 includes a set of routines that emulate platform specific details that provide other software modules and applications access to hardware resources.

In the exemplary embodiment, L2 and L3 applications (apps) 130 include a plurality of L2 and L3 level applications that support graceful shutdown (i.e., all resources are freed, such as those indices allocated through GIM 118, and the hardware resources underpinning the control, data, and management planes are cleaned up before the application terminates). Apps 130 support a restart capability to provide high availability (HA) functionality (i.e., capability to back up and restart if failure occurs).

LSR-1 104 and LSR-2 106 are non-default LSRs created by a default LSR, such as LSR-0 102.

In the exemplary embodiment, the LSR environment includes hardware support (e.g., VRF, LN support on FDB, etc.) for traffic isolation between different LSRs on the data plane.

LSRA 110 is a software component functioning as an agent of LSRM 120 on every switch. LSRA 110 is a global process responsible for set up of the LSR environment on the control plane (such as jail and network namespace) of each switch. In the exemplary embodiment, LSRA 110 launches SMR 122 for each LSR, once the LSR is created.

PM 112 is a software module responsible for port management. PM 112 manages physical port and virtual port (i.e., channel) assignment in the LSR environment. A port database in shared memory (not shown) is maintained in PM 112. PM 112 is responsible for index assignment for hardware resources, such as LAG, multicast, spanning-tree-instance, etc., and is also responsible for enforcement of hardware resource policies for each LSR, such as LSR-1 104 and LSR-2 106. PM 112 is a global process with each switch having only one instance of PM 112 operating on it.

IA 114 is a software module responsible for managing mapping between logical interfaces (LIFs) and hardware ports. IA 114 is a global process with each switch having only one instance of IA 114 operating on it.

SDK 116 is a software module responsible for software development of the network chips in the LSR environment. SDK 116 is a global process with each switch having only one instance of SDK 116 operating on it.

GIM 118 is a software module responsible for index assignment for hardware resources such as LAG, multicast, spanning-tree-instance, etc. GIM 118 manages enforcement of hardware resource polices for one or more LSRs in the LSR system. GIM 118 is a global process with each switch having only one instance of GIM 118 operating on it.

LSR-0 102, LSR-1 104, and LSR-2 106 include multiple processes operating locally on each LSR.

FIGS. 2-7 depict functional flow diagrams for creating, assigning, negotiating, and managing virtual ports (vports) included within a LSR system.

Figure 2:
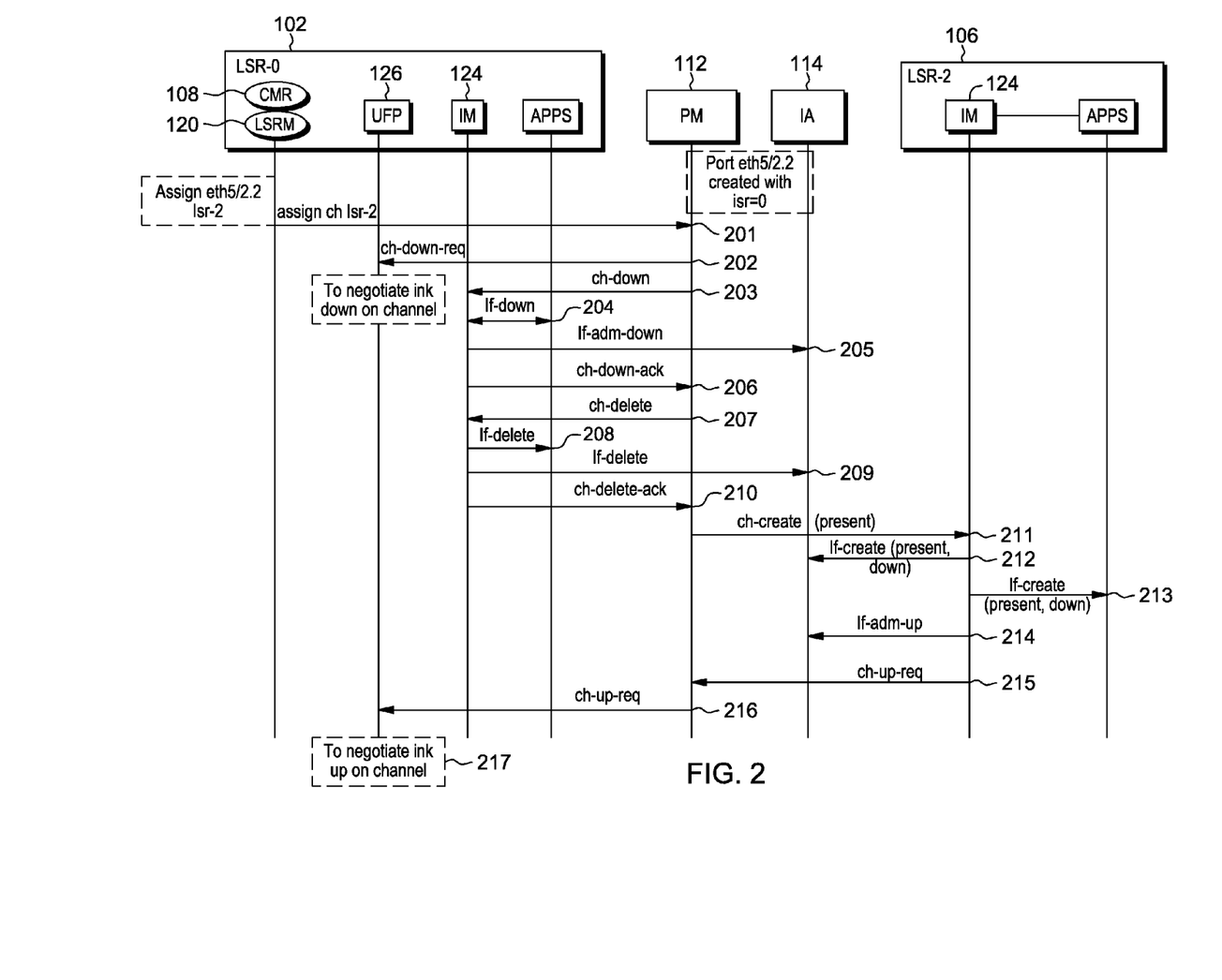
FIG. 2 depicts a functional flow diagram illustrating an assignment of a vport (channel) in a LSR system, in accordance with an embodiment of the present invention.

FIG. 2 depicts a functional flow diagram, generally designated 200, illustrating an assignment of a vport (channel) in a LSR system, where the channel, eth5/2.2, has already been set up by UFP 126, and the related interface loop has been created in LSR-0 102, in accordance with an embodiment of the present invention.

In the exemplary embodiment, a user issues a command to CMR 108 to assign a channel, such as eth5/2.2, to a non-default LSR, such as LSR-2 106, from a default LSR, such as LSR-0 102. CMR 108 sends the command to assign the channel to LSRM 120 in LSR-0 102 for processing.

In response to CMR 108 sending the command to assign the channel to LSRM 120 for processing, LSRM 120 accepts the command to assign the channel and sends a message, "assign-channel(eth5/2.2,LSR-2)" to PM 112 for processing (step 201). In the exemplary embodiment, LSRM 122 updates its local database, confirming the message has been sent to PM 112.

In response to LSRM 120 sending the message to PM 112, PM 112 updates its local database, confirming the message has been received, and sends a message "channel-down-req (eth5/2.2)" to UFP 126 (step 202) and sends a message "channel-down(eth5/2.2)" to IM 124, in LSR-0 102 (step 203).

In response to PM 112 sending the messages to UFP 126 and IM 124 in LSR-0 102, UFP 126 notifies remote peers that the link is brought down, and IM 124 in LSR-0 102 updates its local database, confirming the message has been received, and sends a message "interface-down(eth5/2.2)" to apps 130 in LSR-0 102 (step 204).

IM 124 in LSR-0 102 sends a message "interface-admin-down(eth5/2.2)" to IA 114 (step 205). IA 114 updates its database accordingly.

In response to IM 124 in LSR-0 102 sending the message to IA 114, IM 124 in LSR-0 102 sends a message "channel-down-ack(eth5/2.2)" to PM 112 (step 206).

In response to IM 124 in LSR-0 102 sending the message to PM 112, PM 112, upon receipt of the message, sends a message "channel-delete(eth5/2.2)" to IM 124 in LSR-0 102 (step 207).

In response to PM 112 sending the message to IM 124 in LSR-0 102, IM 124 in LSR-0 102 updates its local database, confirming the message has been received, and sends a message "interface-delete(eth5/2.2)" to apps 130 in LSR-0 102 (step 208). Apps 130 in LSR-0 102 perform a clean up accordingly.

IM 124 in LSR-0 102 sends a message "interface-delete (eth5/2.2)" to IA 114 (step 209). In response to receiving the message from IM 124 in LSR-0 102, IA 114 deletes the specified interface.

IM 124 in LSR-0 102 sends a message "channel-delete-ack(eth5/2.2)" to PM 112 (step 210).

In response to IM 124 in LSR-0 102 sending the message to PM 112, PM 112, upon receipt of the message, sends a message "channel-create(eth5/2.2, hardware-present)" to IM 124 in LSR-2 106 (step 211).

IM 124 in LSR-2 106 binds the channel to a VIF and sends a message "interface-create(eth5/2.2, hardware-present, link-down)" to IA 114 (step 212). IA 114 creates the interface accordingly.

IM 124 in LSR-2 106 sends a message "interface-create (eth5/2.2, hardware-present, link-down)" to apps 130 (step 213). Applications create the interface, and take proper actions to configure the interface, accordingly.

IM 124 in LSR-2 106 sends a message "interface-admin-up(eth5/2.2) to IA 114, where the user configuration for eth5/2 is a "no shut" link state (step 214). IA 114 updates its database accordingly.

IM 124 in LSR-2 106 sends a message "channel-up-req (eth5/2.2)" to PM 112 (step 215).

In response to IM 124 in LSR-2 sending the message to PM 112, PM 112 updates its database accordingly and sends a message "channel-up-req(eht5/2.2)" to UFP 126 in LSR-0 102 (step 216).

In response to PM 112 sending the message to UFP 126, UFP 126 notifies its remote peer that the link in brought up (step 217).

Figure 3:
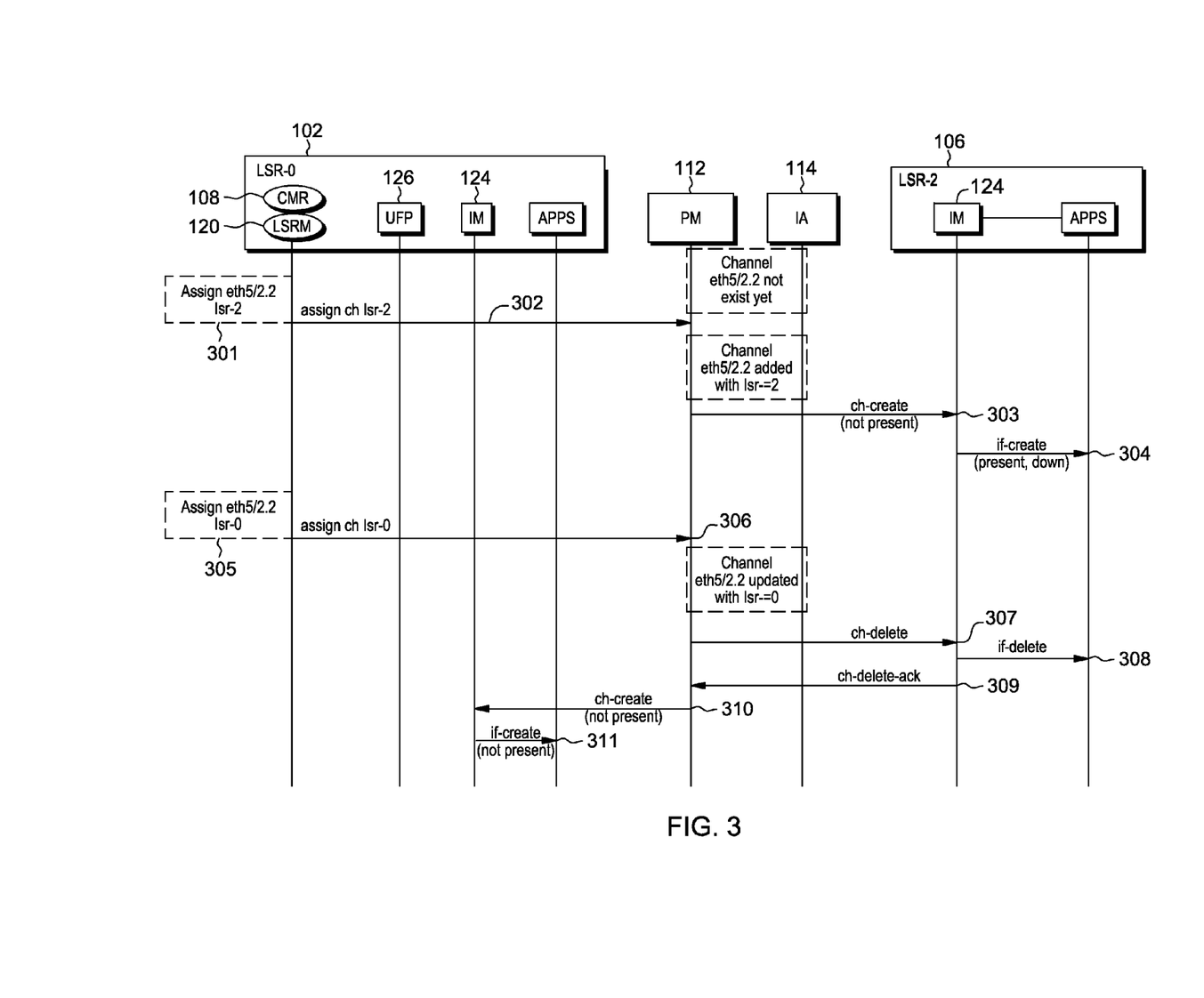
FIG. 3 depicts a functional flow diagram illustrating an assignment of a channel in a LSR system, in accordance with an embodiment of the present invention.

FIG. 3 depicts a functional flow diagram, generally designated 300, illustrating an assignment of a channel in a LSR system, where the channel, eth5/2.2, has not been set up by UFP 126, in accordance with an embodiment of the present invention.

In the exemplary embodiment, a user issues a command to CMR 108 to create and assign a channel, such as eth5/2.2, to a non-default LSR, such as LSR-2 106, from a default LSR, such as LSR-0 102 (step 301). CMR 108 sends the command to assign the channel to LSRM 120 in LSR-0 102 for processing.

In response to CMR 108 sending the command to assign the channel to LSRM 120 for processing, LSRM 120 accepts the command to assign the channel and sends a message, "assign-channel(eth5/2.2,LSR-2)" to PM 112 for processing (step 302). In the exemplary embodiment, LSRM 122 updates its local database, confirming the message has been sent to PM 112.

In response to LSRM 120 sending the message to PM 112, PM 112 updates its local database, confirming the message has been received, and sends a message "channel-create (eth5/2.2, hardware-not-present)" to IM 124, in LSR-0 102 (step 303).

IM 124 in LSR-2 106 binds the channel to a VIF and sends a message "interface-create(eth5/2.2, hardware-not-present) to apps 130 as needed (step 304). Applications create the interface and take no other actions.

In the exemplary embodiment, a user issues a command to CMR 108 to assign the channel back to LSR-0 102 (step 305). CMR 108 sends the command to assign the channel to LSRM 120 in LSR-0 102 for processing.

In response to CMR 108 sending the command to assign the channel to LSRM 120 for processing, LSRM 120 accepts the command to assign the channel and sends a message, "assign-channel(eth5/2.2,LSR-0)" to PM 112 for processing (step 306). LSRM 120 updates its local database, confirming the message has been sent to PM 112.

In response to LSRM 120 sending the message to PM 112, PM 112 updates its local database, confirming the message has been received, and sends a message "channel-delete (eth5/2.2)" to IM 124, in LSR-2 106 (step 307).

In response to PM 122 sending the message to IM 124 in LSR-2 106, IM 124 in LSR-2 106 sends a message "interface-delete(eth5/2.2)" to apps 130 as needed (step 308). Applications update their databases accordingly.

IM 124 in LSR-2 106 sends a message "channel-delete-ack(eth5/2.2)" back to PM 112 (step 309).

In response to IM 124 in LSR-2 106 sending the message back to PM 112, PM 112 sends a message "channel-create (eth5/2.2, hardware-not-present)" to IM 124 in LSR-0 102 (step 310).

In response to PM 112 sending the message to IM 124 in LSR-0 102, IM 124 in LSR-0 102 binds the channel to a VIF and sends a message "interface-create(eth5/2.2, hardware-not-present)" to apps 130 in LSR-0 102 (step 311). Applications in LSR-0 102 should create the interface and take no other actions.

Figure 4:
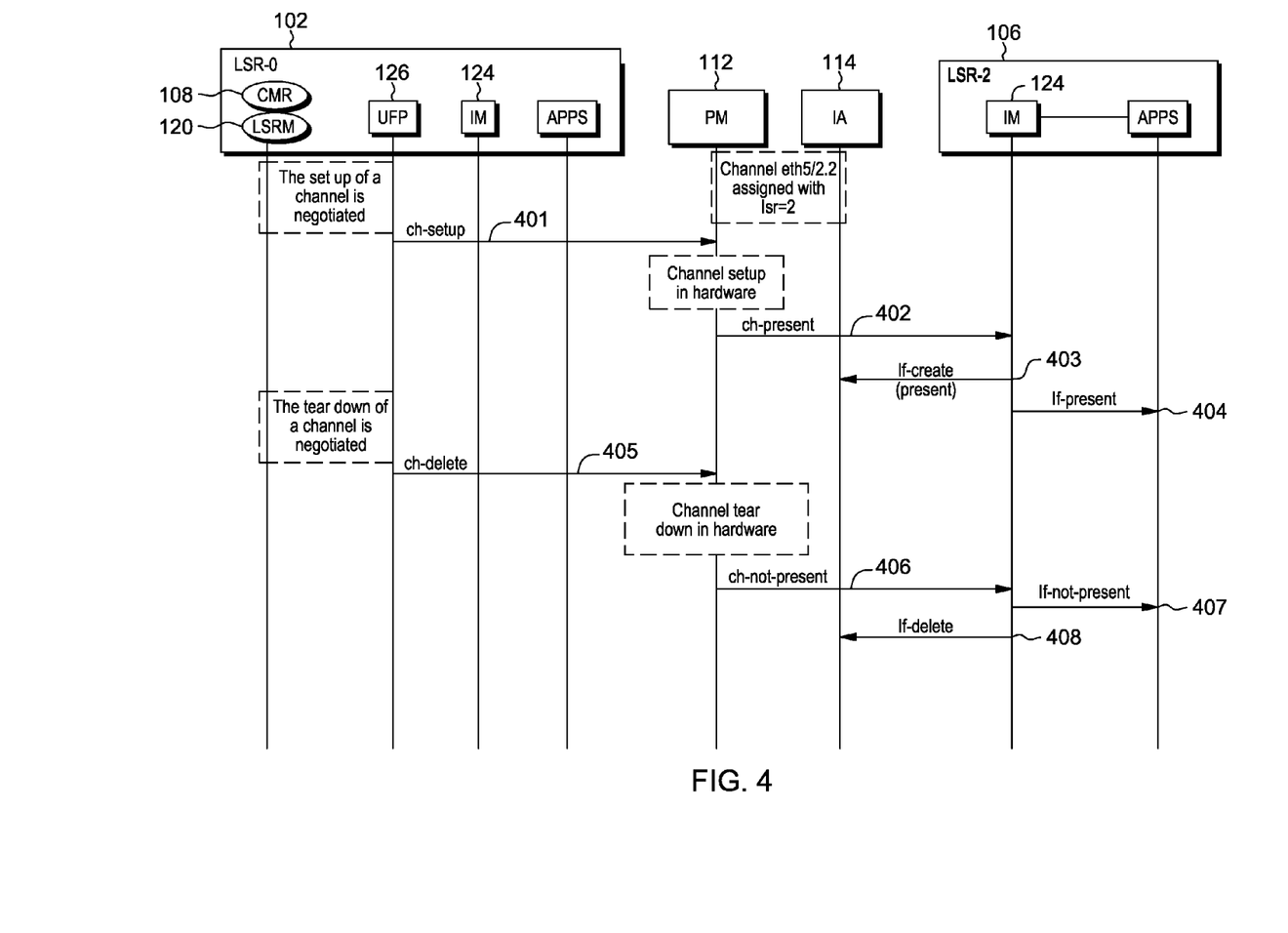
FIG. 4 depicts a functional flow diagram illustrating the steps of a universal fabric port (UFP) 126 for negotiating a set up or tear down of a channel in a LSR system, in accordance with an embodiment of the present invention.

FIG. 4 depicts a functional flow diagram, generally designated 400, illustrating the steps of UFP 126 for negotiating a set up or tear down of a channel in a LSR system, where the channel, eth5/2.2, has already been assigned to LSR-2 106, in accordance with an embodiment of the present invention.

In the exemplary embodiment, UFP 126 in LSR-0 102 negotiates with its remote peer to set up a channel, eth5/2.2 and sends a message "channel-setup(eht5/2.2)" to PM 112 (step 401).

In response to UFP 124 sending the message to PM 112, PM 112 sets up the channel in hardware and sends a message "channel-present(eth5/2.2)" to IM 124 in LSR-2 106 (step 402).

In response to PM 112 sending the message to IM 124 in LSR-2 106, IM 124 in LSR-2 106 binds the channel to a VIF and sends a message "interface-create(eth5/2.2, hardware-present, link-down)" to IA 114 (step 403). IA 114 creates the interface accordingly.

IM 124 in LSR-2 106 sends a message "interface-create (eth5/2.2, hardware-present, link-down)" to apps 130 in LSR-0 102 (step 404). Applications in LSR-0 102 take proper action for configuration of the interface accordingly.

UFP 126 in LSR-0 102 negotiates with its remote peer to tear down a channel, eth5/2.2 and sends a message "channel-teardown(eth5/2.2)" to PM 112 (step 405).

In response to UFP 126 in LSR-0 102 sending the message to PM 112, PM 112 tears down the channel in hardware and sends a message "channel-not-present(eth5/2.2)" message to IM 124 in LSR-2 106 (step 406).

IM 124 in LSR-2 106 sends a message "interface-create (eth5/2.2, hardware-not-present)" to apps 130 in LSR-2 106 (step 407). Applications in LSR-2 106 perform clean up accordingly.

IM 124 in LSR-2 106 sends a message "interface-delete (eth5/2.2)" to IA 114 (step 408). IA 114 deletes the interface accordingly.

Figure 5:
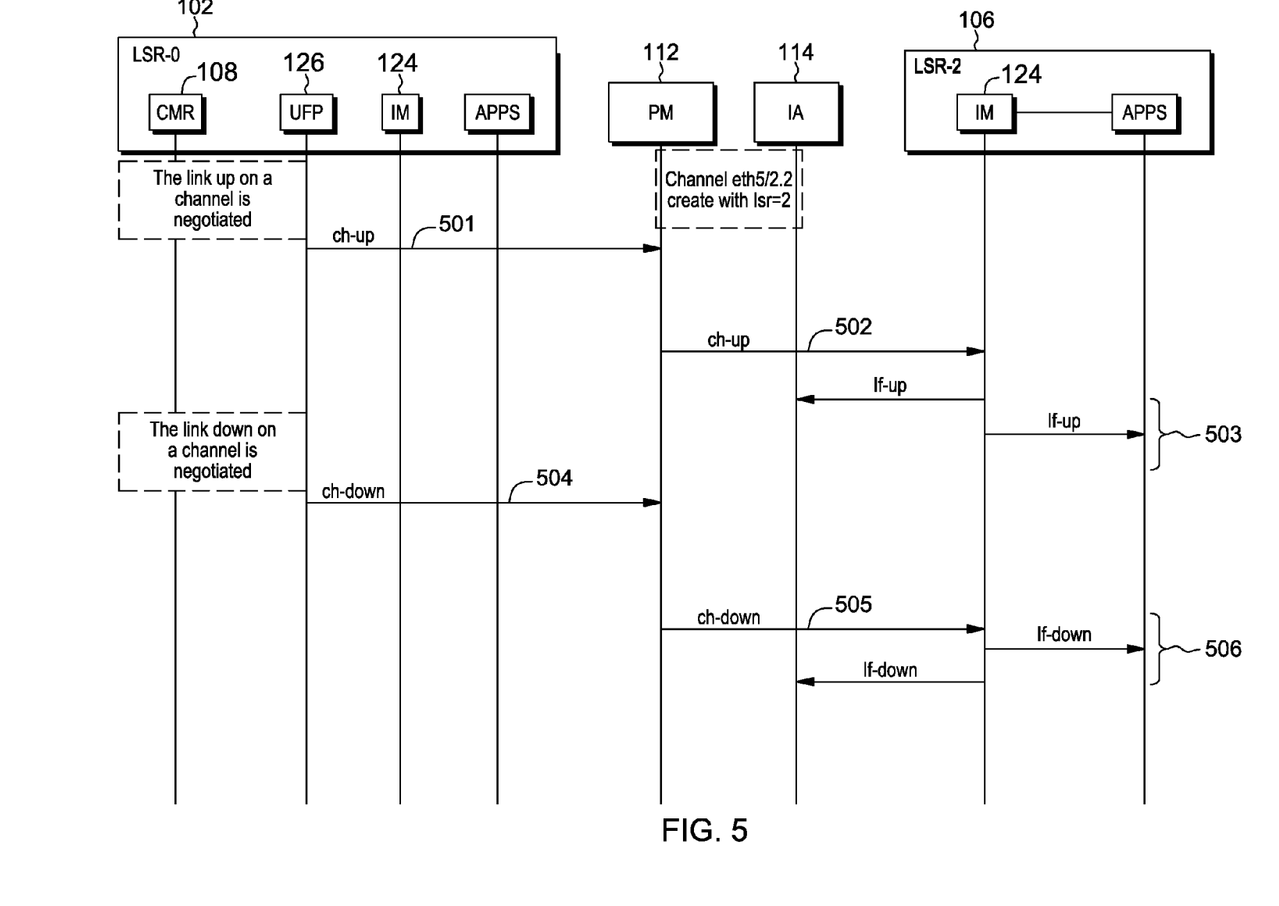
FIG. 5 depicts a functional flow diagram illustrating the steps of UFP 126 for negotiating a link up/down on a channel in a LSR system, in accordance with an embodiment of the present invention.

FIG. 5 depicts a functional flow diagram, generally designated 500, illustrating the steps of UFP 126 for negotiating a link up/down on a channel in a LSR system, where the channel, eth5/2.2, has already been assigned to LSR-2 106, in accordance with an embodiment of the present invention.

In the exemplary embodiment, UFP 126 in LSR-0 102 negotiates with its remote peer that the link on a channel, eth5/2.2, is brought up and sends a message "channel-up (eth5/2)" to PM 112 (step 501).

In response to UFP 126 in LSR-0 102 sending the message to PM 112, PM 112 sends a message "channel-up (eht5/2.2)" to IM 124 in LSR-2 106 (step 502).

In response to PM 112 sending the message to IM 124 in LSR-2 106, IM 124 in LSR-2 106 sends a message "interface-up(eth5/2.2)" to apps 130 in LSR-2 106 and to IA 114 (step 503). Applications in LSR-2 106 start a protocol negotiation on that channel when needed, and IA 114 updates the interface accordingly.

UFP 126 in LSR-0 102 negotiates with its remote peer that the link on the channel, eth5/2.2, is brought down, and sends a message "channel-down(eth5/2.2)" to PM 112 (step 504).

In response to UFP 126 in LSR-0 102 sending the message to PM 112, PM 112 sends a message "channel-down(eth5/2.2)" to IM 124 in LSR-2 106 (step 505).

In response to PM 112 sending the message to IM 124 in LSR-2 106, IM 124 in LSR-2 106 sends a message "interface-down(eth5/2.2)" to IA 114 and apps 130 in LSR-2 106 (step 506). IA 114 and apps 130 in LSR-2 106 update its interface accordingly.

Figure 6:
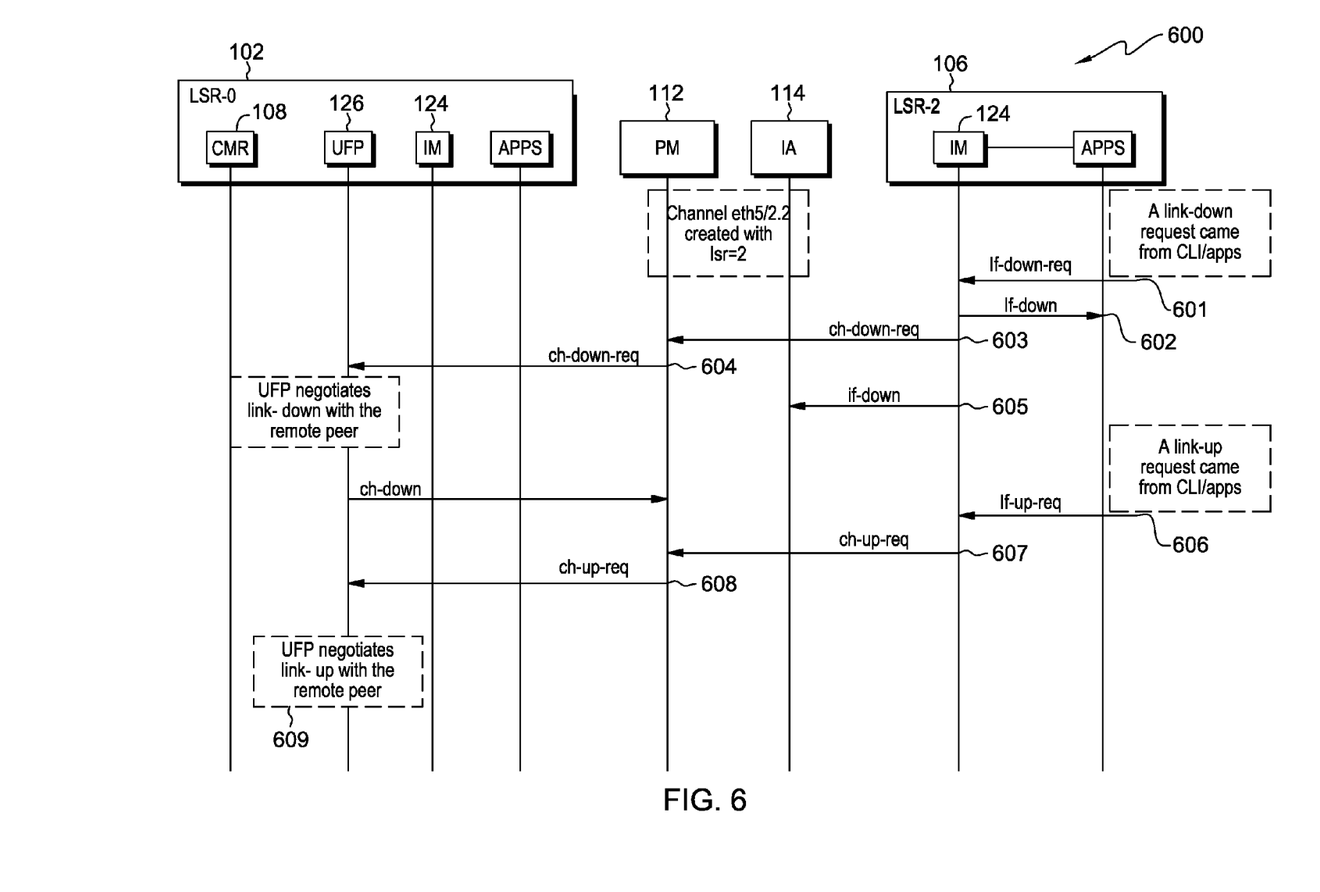
FIG. 6 depicts a functional flow diagram illustrating the steps for negotiating a shut and no shut of a channel in a LSR system, in accordance with an embodiment of the present invention.

FIG. 6 depicts a functional flow diagram, generally designated 600, illustrating the steps for negotiating a shut and no shut of a channel in a LSR system, where the channel, eth5/2.2, has already been assigned to LSR-2 106, in accordance with an embodiment of the present invention.

In the exemplary embodiment, a user in LSR-2 106 issues a "shut" request on a channel, eth5/2.2 to CMR 108, and CMR 108 sends a message "interface-down-request(eth5/2.2)" to IM 124 in LSR-2 106 for processing (step 601).

In response to CMR 108 sending the message to IM 124 in LSR-2 106, IM 124 in LSR-2 106 sends a message "interface-down(eth5/2.2)" to apps 130 in LSR-2 106 (step 602).

IM 124 in LSR-2 106 sends a message "channel-down-request(eth5/2.2)" to PM 112 and IA 114 (step 603).

In response to IM 124 in LSR-2 106 sending the message to PM 112, PM 112 updates its database accordingly and sends a message "channel-down-request(eth5/2.2)" to UFP 126 of LSR-0 102 (step 604).

In response to PM 112 sending the message to UFP 126 of LSR-0 102, UFP 126 of LSR-0 102 negotiates with its remote peer to bring down the link (step 605).

In the exemplary embodiment, a user in LSR-2 106 issues a "no shut" request on a channel, eth5/2.2 to CMR 108, and CMR 108 sends a message "interface-up-request(eth5/2.2)" to IM 124 in LSR-2 106 for processing (step 606).

In response to CMR 108 sending the message to IM 124 in LSR-2 106, IM 124 in LSR-2 106 sends a message "channel-up-request(eth5/2.2)" to PM 112 (step 607).

In response to IM 124 in LSR-2 106 sending the message to PM 112, PM 112 updates its database accordingly and sends a message "channel-up-request(eth5/2.2)" to UFP 126 in LSR-0 102 (step 608).

In response to PM 112 sending the message to UFP 126 in LSR-0 102, UFP 126 in LSR-0 102 negotiates with its remote peer to bring the link up (step 609).

Figure 7:
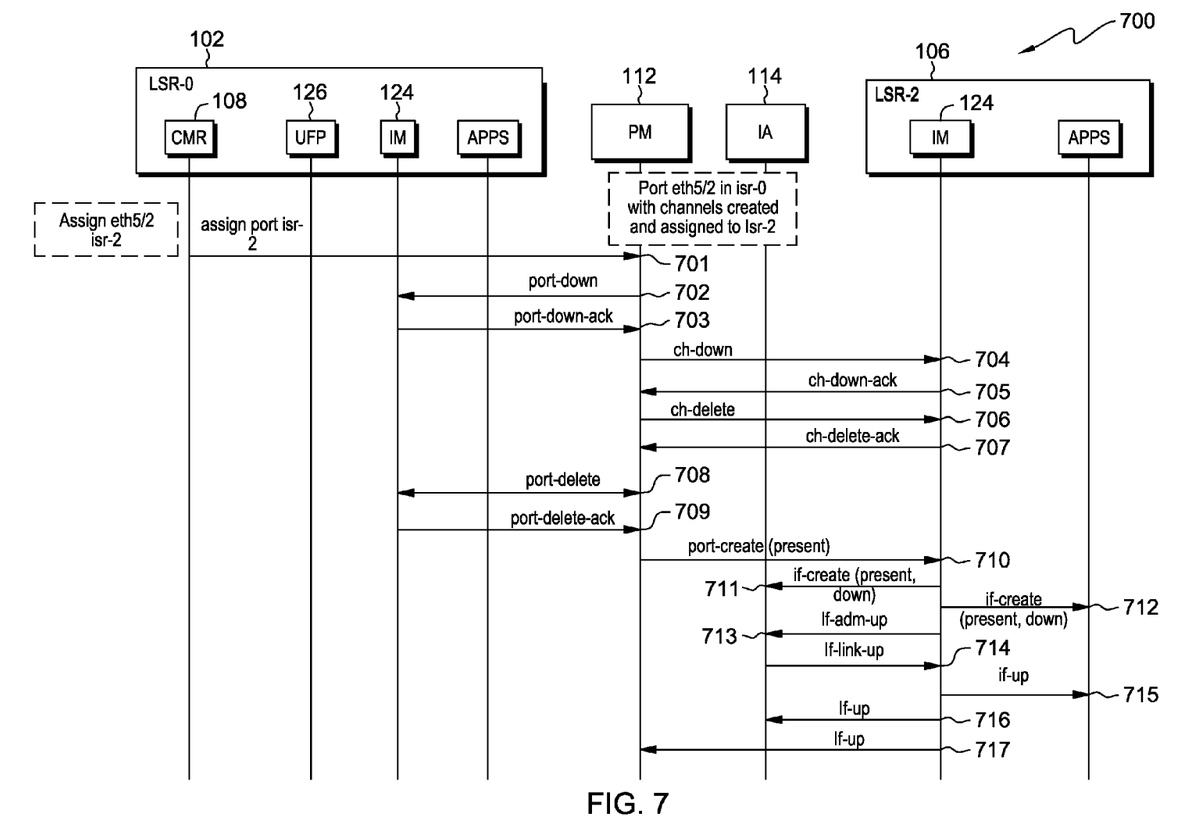
FIG. 7 depicts a functional flow diagram illustrating the steps for assigning a physical port that has one or more vports established on its top in a LSR system, in accordance with an embodiment of the present invention.

FIG. 7 depicts a functional flow diagram, generally designated 700, illustrating the steps for assigning a physical port that has one or more vports established on its top in a LSR system, where the physical port, eth5/2, is in LSR-0 102 with channels created and assigned to LSR-2 106, in accordance with an embodiment of the present invention.

In the exemplary embodiment, a user issues a command to CMR 108 to assign a physical port, eth5/2, to a non-default LSR, such as LSR-2 106, from a default LSR, such as LSR-0 102 and CMR 108 sends the command to assign the channel to LSRM 120 in LSR-0 102 for processing.

In response to CMR 108 sending the command to assign the physical port to LSRM 120 for processing, LSRM 120 accepts the command to assign the channel and sends a message, "assign-port(eth5/2,LSR-2)" to PM 112 for processing (step 701). In the exemplary embodiment, LSRM 120 updates its local database, confirming the message has been sent to PM 112.

In response to LSRM 120 sending the message to PM 112, PM 112 updates its database accordingly and sends a message "port-down(eth5/2)" to IM 124 in LSR-0 102 for processing (step 702).

In response to PM 112 sending the message to IM 124 in LSR-0 102, IM 124 in LSR-0 102 updates its database and sends a message "interface-down(eth5/2)" to apps 130 in LSR-0 102, sends a message "interface-admin-down(eth5/2)" to IA 114, and sends a message "port-down-ack(eth5/2)" back to PM 112 (step 703).

In response to IM 124 in LSR-0 102 sending the message to PM 112, PM 112 sends a message "channel-down(eth5/2.x)" to IM 124 in LSR-2 106 for processing (step 704).

In response to PM 112 sending the message to IM 124 in LSR-2 106, IM 124 in LSR-2 106 sends a message "channel-down-ack(eth5/2)" to PM 112 (step 705).

In response to IM 124 in LSR-2 106 sending the message to PM 112, PM 112 sends a message "channel-delete(eth5/2.x)" to IM 124 in LSR-2 106 for processing (step 706).

In response to PM 112 sending the message to IM 124 in LSR-2 106, IM 124 in LSR-2 106 sends a message "channel-delete-ack(eth5/2)" to PM 112 (step 707).

In response to IM 124 in LSR-2 106 sending the message to PM 112, PM 112 sends a message "port-delete(eth5/2)" to IM 124 in LSR-2 106 for processing (step 708).

In response to PM sending the message to IM 124 in LSR-2 106, IM 124 in LSR-2 106 sends a message "port-delete-ack(eth5/2)" to PM 112 (step 709).

In response to IM 124 in LSR-2 106 sending the message to PM 112, PM 112 sends a message "port-create(eth5/2, hardware-present, link-down)" to IM 124 in LSR-2 106 for processing (step 710).

In response to PM 112 sending the message to IM 124 in LSR-2 106, IM 124 in LSR-2 106 sends a message "interface-create (eth5/2, hardware-present, link-down)" to IA 114 (step 711). IA 114 creates the interface accordingly.

IM 124 in LSR-2 106 sends a message "interface-create (eth5/2, hardware-present, link-down)" to apps 130 in LSR-2 106 (step 712). Apps 130 in LSR-2 106 create the interface and take proper actions for configuration of the interface accordingly.

In the exemplary embodiment, assuming the user configuration for eth5/2 is "no shut," IM 124 in LSR-2 106 sends a message "interface-admin-up(eth5/2)" to IA 114 (step 713). IA 114 turns on the link on the port in the hardware.

In response to link up from the hardware, IA 114 sends a message "interface-link-up(eth5/2)" to IM 124 in LSR-2 106 (step 714).

In response to IA 114 sending the message to IM 124 in LSR-2 106, IM 124 in LSR-2 106 sends a message "interface-up(eth5/2)" to apps 130 in LSR-2 106 (step 715) and IA 114 (step 716). Apps 130 perform proper actions accordingly, and IA 114 updates its database accordingly.

IM 124 in LSR-2 106 sends a message "interface-up(eth5/2)" to PM 112 (step 717). PM 112 updates its database accordingly.

Figure 8:
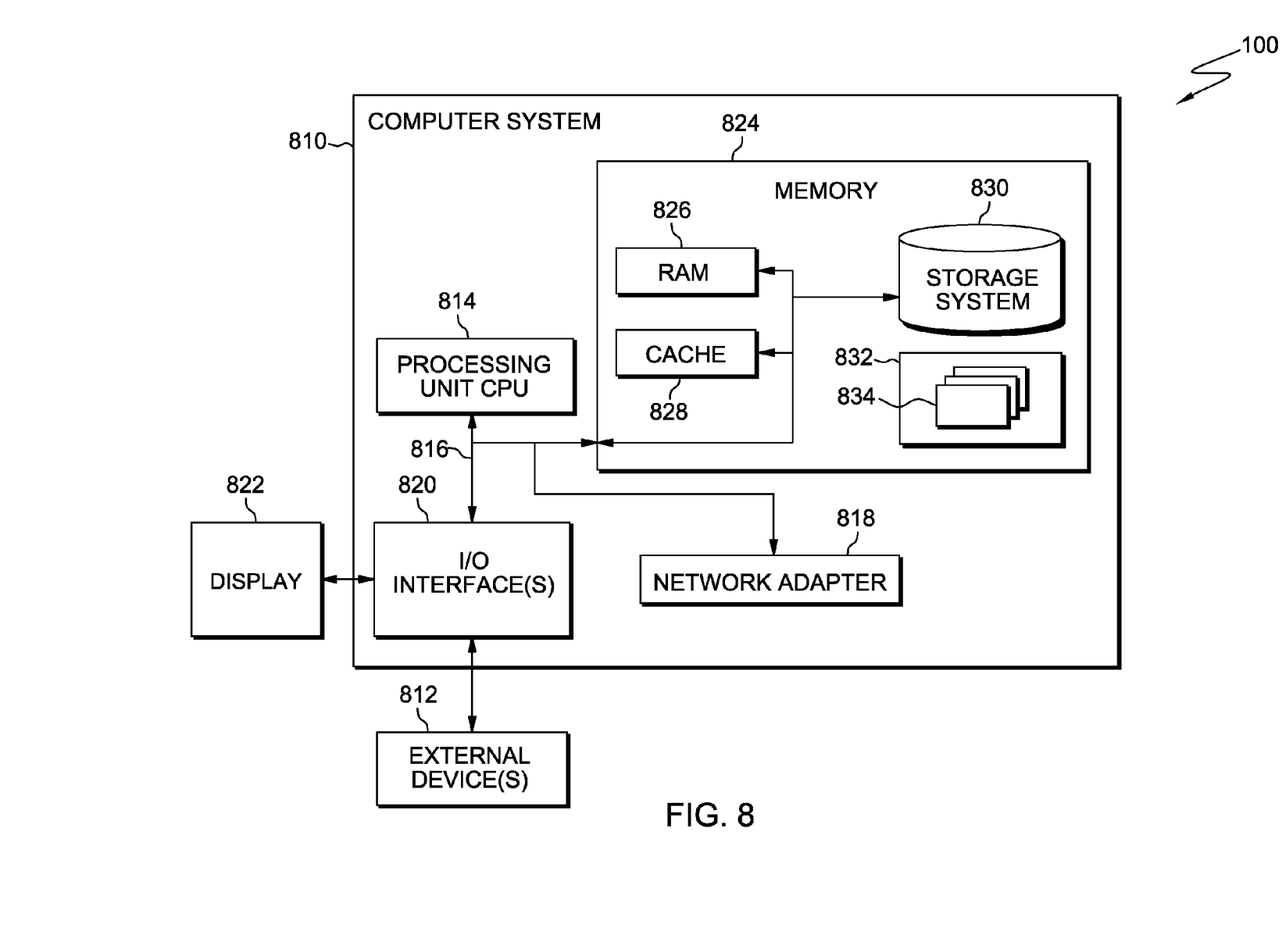
FIG. 8 depicts a block diagram of components of data processing system 100, in accordance with an illustrative embodiment of the present invention.

FIG. 8 depicts a block diagram of components of data processing system 100, in accordance with an illustrative embodiment of the present invention. It should be appreciated that FIG. 8 provides only an illustration of one implementation and does not imply any limitations with regard to the environments in that different embodiments may be implemented. Many modifications to the depicted environment may be made.

Computer system 810 in data processing system 100 is shown in the form of a general-purpose computing device. The components of computer system 810 may include, but are not limited to, one or more processors or processing units 814, a system memory 824, and a bus 816 that couples various system components including system memory 824 to processor 814.

Bus 816 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 810 typically includes a variety of computer system readable media. Such media may be any available media that is accessible by computer system 810, and it includes both volatile and non-volatile media, removable and non-removable media.

System memory 824 can include computer system readable media in the form of volatile memory, such as random access memory (RAM) 826 and/or cache memory 828. Computer system 810 may further include other removable/non-removable, volatile/non-volatile computer system storage media. By way of example only, storage system 830 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 816 by one or more data media interfaces. As will be further depicted and described below, system memory 824 may include at least one computer program product having a set (e.g., at least one) of program modules that are configured to carry out the functions of embodiments of the invention.

Program/utility 832, having one or more sets of program modules 834, may be stored in memory 824 by way of example, and not limitation, as well as an operating system, one or more application programs, other program modules, and program data. Each of the operating systems, one or more application programs, other program modules, and program data, or some combination thereof, may include an implementation of a networking environment. Program modules 834 generally carry out the functions and/or methodologies of embodiments of the invention as described herein. Computer system 810 may also communicate with one or more external devices 812 such as a keyboard, a pointing device, a display 822, etc. one or more devices that enable a user to interact with computer system 810 and any devices (e.g., network card, modem, etc.) that enable computer system 810 to communicate with one or more other computing devices. Such communication can occur via input/Output (I/O) interfaces 820. Still yet, computer system 810 can communicate with one or more networks such as a local area network (LAN), a general wide area network (WAN), and/or a public network (e.g., the Internet) via network adapter 818. As depicted, network adapter 818 communicates with the other components of computer system 810 via bus 816. It should be understood that although not shown, other hardware and software components, such as microcode, device drivers, redundant processing units, external disk drive arrays, RAID systems, tape drives, and data archival storage systems may be used in conjunction with computer system 810.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system having a logical switch architecture supporting virtual port assignment across one or more logical switch routers in a distributed system, the computer system comprising:
   one or more computer processors;
   one or more computer-readable storage devices;
   program instructions stored on the one or more computer-readable storage devices for execution by at least one of the one or more computer processors, the program instructions comprising:
      a first software module that controls and manages two or more logical switch routers in the distributed system, a first logical switch router of the two or more logical switch routers being a default logical switch router that cannot be deleted, has a plurality of physical ports assigned thereto, and includes an interface manager, a universal fiber port, and a hardware abstraction layer that includes a set of routines that emulate platform specific details that provide software modules and applications access to hardware resources;

a second software module that controls and manages a plurality of physical ports and a plurality of virtual ports on the two or more logical switch routers in the distributed system, wherein each of the plurality of physical ports and each of the plurality of virtual ports belong to only one logical switch router of the two or more logical switch routers, wherein no virtual ports exist in the distributed system initially until created by user configuration or via protocol negotiation, and wherein all of the plurality of physical ports and the plurality of virtual ports initially belong to the default logical switch router until assigned to a different logical switch router of the two or more logical switch routers;

a third software module that controls and manages a plurality of logical interfaces in the distributed system;

a fourth software module that communicates with and connects to the plurality of virtual ports on the two or more logical switch routers in the distributed system; and a fifth software module that launches and monitors all software processes within each switch of the default logical switch router.

2. The computer system of claim 1, wherein the first software module receives one or more user requests, wherein the one or more user requests are selected from a group comprising:

a user request to assign one or more virtual ports to the two or more logical switch routers in the distributed system;

a user request to shut a link of the one or more virtual ports on the two or more logical switch routers in the distributed system;

a user request to no shut a link of the one or more virtual ports on the two or more logical switch routers in the distributed system; and a user request to assign one or more physical ports having the one or more virtual ports established on top of the one or more physical ports to the two or more logical switch routers in the distributed system.

3. The computer system of claim 1, wherein the second software module receives one or more messages, the one or more messages comprising:

a message from the first software module configured to assign at least one of the plurality of physical ports and at least one of the plurality of virtual ports to the two or more logical switch routers in the distributed system;

a message from the third software module configured to perform an action selected from a group consisting of: acknowledge a port-down has been executed, acknowledge a port-delete has been executed, notify that at least one of the plurality of physical ports and at least one of the plurality of virtual ports is up, and notify that at least one of the plurality of physical ports and at least one of the plurality of virtual ports is down; and a message from the fourth software module configured to perform an action selected from a group consisting of: set up at least one of the plurality of virtual ports, teardown at least one of the plurality of virtual ports on the two or more logical switch routers in the distributed system, indicate that at least one of the plurality of virtual ports is link-up, and indicate that at least one of the plurality of virtual ports is link-down.

4. The computer system of claim 1, wherein the second software module receives one or more first messages and send one or more second messages,
wherein the one or more first messages comprise:

a message from the first software module configured to assign at least one of the plurality of physical ports and at least one of the plurality of virtual ports to the two or more logical switch routers in the distributed system;

a message from the third software module configured to perform an action selected from a group consisting of: acknowledge a port-down has been executed, acknowledge a port-delete has been executed, notify that at least one of the plurality of physical ports and at least one of the plurality of virtual ports is up, and notify that at least one of the plurality of physical ports and at least one of the plurality of virtual ports is down; and a message from the fourth software module configured to perform an action selected from a group consisting of: set up at least one of the plurality of virtual ports, teardown at least one of the plurality of virtual ports on the two or more logical switch routers in the distributed system, indicate that at least one of the plurality of virtual ports is link-up, and indicate that at least one of the plurality of virtual ports is link-down, and wherein the one or more second messages comprise:

a message to the third software module configured to: indicate that at least one of the plurality of virtual ports is created or deleted, indicate that at least one of the plurality of virtual ports is link-up or link-down, and indicate that at least one of the plurality of virtual ports is set up or torn down; and a message to the fourth software module configured to: link-up at least one of the plurality of virtual ports on the two or more logical switch routers in the distributed system, and link-down at least one of the plurality of virtual ports on the two or more logical switch routers in the distributed system.

5. The computer system of claim 1, wherein the third software module receives one or more first messages from the second software module and sends one or more second messages, the one or more first messages comprising:

a message to the second software module configured to: indicate that a port-down and a port-delete has been executed, indicate that at least one of the plurality of physical ports is up and that at least one of the plurality of physical ports is down, indicate a link-up request and a link-down request for at least one of the plurality of virtual ports on the two or more logical switch routers, and indicate that a channel-down and a channel-delete has been executed; and a message to one or more applications included within the two or more logical switch routers in the distributed system configured to: indicate that an interface is create and deleted, indicate that an interface is up or down for at least one of the plurality of physical ports on the two or more logical switch routers, and indicate that an interface is up or down for at least one of the plurality of virtual ports on the two or more logical switch routers.

6. The computer system of claim 1, wherein the fifth software module:

launches a first software process in the default logical switch router; and sends a request to launch the first software process in all switches within the default logical switch router in response to launching the first software process in the default logical switch router.

7. The computer system of claim 1, wherein the fourth software module receives one or more messages from the second software module, wherein the one or more messages are selected from a group consisting of:
   a message to bring a link-up on at least one of the plurality of virtual ports on the two or more logical switch routers in the distributed system; and
   a message to bring a link-down on at least one of the plurality of virtual ports on the two or more logical switch routers in the distributed system, and
   wherein the universal fiber port includes a universal arbitrated fiber port configured to communicate with and connect to the plurality of physical ports.

8. The computer system of claim 1, wherein the first software module receives one or more user requests, wherein the one or more user requests comprise:
   a user request to assign one or more virtual ports to the two or more logical switch routers in the distributed system;
   a user request to shut a link of the one or more virtual ports on the two or more logical switch routers in the distributed system;
   a user request to no shut a link of the one or more virtual ports on the two or more logical switch routers in the distributed system; and
   a user request to assign one or more physical ports having the one or more virtual ports established on top of the one or more physical ports to the two or more logical switch routers in the distributed system,
   wherein the second software module receives one or more first messages and send one or more second messages, wherein the one or more first messages comprise:
   a message from the first software module configured to assign at least one of the plurality of physical ports and at least one of the plurality of virtual ports to the two or more logical switch routers in the distributed system;
   a message from the third software module configured to perform an action selected from a group consisting of: acknowledge a port-down has been executed, acknowledge a port-delete has been executed, notify that at least one of the plurality of physical ports and at least one of the plurality of virtual ports is up, and notify that at least one of the plurality of physical ports and at least one of the plurality of virtual ports is down; and
   a message from the fourth software module configured to perform an action selected from a group consisting of: set up at least one of the plurality of virtual ports, teardown at least one of the plurality of virtual ports on the two or more logical switch routers in the distributed system, indicate that at least one of the plurality of virtual ports is link-up, and indicate that at least one of the plurality of virtual ports is link-down, and
   wherein the one or more second messages comprise:
   a message to the third software module configured to: indicate that at least one of the plurality of virtual ports is created or deleted, indicate that at least one of the plurality of virtual ports is link-up or link-down, and indicate that at least one of the plurality of virtual ports is set up or torn down; and
   a message to the fourth software module configured to: link-up at least one of the plurality of virtual ports on the two or more logical switch routers in the distributed system, and link-down at least one of the plurality of virtual ports on the two or more logical switch routers in the distributed system,
   wherein the third software module receives one or more third messages from the second software module and send one or more fourth messages, the one or more third messages comprising:
   a message to the second software module configured to: indicate that a port-down and a port-delete has been executed, indicate that at least one of the plurality of physical ports is up and that at least one of the plurality of physical ports is down, indicate a link-up request and a link-down request for at least one of the plurality of virtual ports on the two or more logical switch routers, and indicate that a channel-down and a channel-delete has been executed; and
   a message to one or more applications included within the two or more logical switch routers in the distributed system configured to: indicate that an interface is create and deleted, indicate that an interface is up or down for at least one of the plurality of physical ports on the two or more logical switch routers, and indicate that an interface is up or down for at least one of the plurality of virtual ports on the two or more logical switch routers,
   wherein the fourth software module sends one or more fifth messages to the second software module, wherein the one or more fifth messages are selected from a group consisting of:
   a message of a link-up;
   a message of a link-down;
   a message to teardown at least one of the plurality of virtual ports; and
   a message to set up at least one of the plurality of virtual ports.

9. A method for assigning virtual port channels to two or more logical switch routers in a distributed system, the method comprising:
   receiving, by one or more computer processors, a request to assign a virtual port channel from a first logical switch router to a second logical switch router;
   sending, by the one or more computer processors, a request to negotiate a link-down on the virtual port channel on the first logical switch router to a universal fiber port on the first logical switch router for processing;
   sending, by the one or more computer processors, a request to delete the virtual port channel on the first logical switch router to a first interface manager on the first logical switch router for processing;
   sending, by the one or more computer processors, a request to create the virtual port channel on the second logical switch router to a second interface manager on the second logical switch router for processing; and
   sending, by the one or more computer processors, a request to negotiate a link-up on the virtual port channel on the second logical switch router to the universal fiber port on the first logical switch router for processing,
   wherein the first logical switch router is a default logical switch router that cannot be deleted, has a plurality of physical ports assigned thereto, and includes an interface manager, the universal fiber port, and a hardware abstraction layer that includes a set of routines that emulate platform specific details that provide software modules and applications access to hardware resources,
   wherein the virtual port channel belongs to only one logical switch router at any given time, and
   wherein the virtual port channel initially belongs to the default logical switch router.

10. The method of claim 9, wherein sending the request to negotiate the link-down on the virtual port channel on the first logical switch router to the universal fiber port on the first logical switch router for processing, further comprises notifying, by the one or more computer processors, one or more remote peers that a link is brought down and updating, by the one or more computer processors, a local database for the first interface manager on the first logical switch router.

11. The method of claim 9, wherein sending the request to delete the virtual port channel on the first logical switch router to the first interface manager on the first logical switch router for processing, further comprises sending, by the one or more computer processors, a request to delete an interface on the first logical switch router to an interface agent for processing.

12. The method of claim 11, wherein sending the request to delete the interface on the first logical switch router to the interface agent for processing, further comprises sending, by the one or more computer processors, a message that the virtual port channel is deleted to a port manager.

13. The method of claim 9, wherein sending the request to create the virtual port channel on the second logical switch router to the second interface manager on the second logical switch router for processing, further comprises:
   sending, by the one or more computer processors, a request to create an interface to the second interface manager for processing, wherein no virtual ports exist in the distributed system initially until created by the default logical switch router, and wherein all physical ports and virtual ports initially belong to the default logical switch router until assigned to a different logical switch router; and
   sending, by the one or more computer processors, a request to link-up the virtual port channel to a port manager and the universal fiber port for processing.

14. The method of claim 9, further comprising:
   launching, by the one or more computer processors, a first software process in the default logical switch router; and
   sending, by the one or more computer processors, a request to launch the first software process in all switches within the default logical switch router in response to launching the first software process in the default logical switch router.

15. A computer program product for assigning virtual port channels to two or more logical switch routers in a distributed system, the computer program product comprising:
   one or more computer-readable storage devices and program instructions stored on the one or more computer-readable storage devices, the program instructions being configured to cause one or more computer processors to:
      receive, by the one or more computer processors, a request to assign a virtual port channel from a first logical switch router to a second logical switch router;
      send, by the one or more computer processors, a request to negotiate a link-down on the virtual port channel on the first logical switch router to a universal fiber port on the first logical switch router for processing;
      send, by the one or more computer processors, a request to delete the virtual port channel on the first logical switch router to a first interface manager on the first logical switch router for processing;
      send, by the one or more computer processors, a request to create the virtual port channel on the second logical switch router to a second interface manager on the second logical switch router for processing; and
      send, by the one or more computer processors, a request to negotiate a link-up on the virtual port channel on the second logical switch router to the universal fiber port on the first logical switch router for processing,
   wherein the first logical switch router is a default logical switch router that cannot be deleted, has a plurality of physical ports assigned thereto, and includes an interface manager, the universal fiber port, and a hardware abstraction layer that includes a set of routines that emulate platform specific details that provide software modules and applications access to hardware resources,
   wherein the virtual port channel belongs to only one logical switch router at any given time, and
   wherein the virtual port channel initially belongs to the default logical switch router.

16. The computer program product of claim 15, wherein the program instructions to send the request to negotiate the link-down on the virtual port channel on the first logical switch router to the universal fiber port on the first logical switch router for processing, further cause the one or more computer processors to notify, by the one or more computer processors, one or more remote peers that the link is brought down and updating, by one or more computer processors, a local database for the first interface manager on the first logical switch router.

17. The computer program product of claim 15, wherein the program instructions to send the request to delete the virtual port channel on the first logical switch router to the first interface manager on the first logical switch router for processing, further cause the one or more computer processors to send, by the one or more computer processors, a request to delete an interface on the first logical switch router to an interface agent for processing.

18. The computer program product of claim 17, wherein the program instructions to send a request to delete the interface on the first logical switch router to the interface agent for processing, further cause the one or more computer processors to send, by the one or more computer processors, a message that the virtual port channel is deleted to a port manager.

19. The computer program product of claim 15, wherein the program instructions to send the request to create the virtual port channel on the second logical switch router to the second interface manager on the second logical switch router for processing, further cause the one or more computer processors to:
   send, by the one or more computer processors, a request to create an interface to the second interface manager for processing, wherein no virtual ports exist in the distributed system initially until created by the default logical switch router, and wherein all physical ports and virtual ports initially belong to the default logical switch router until assigned to a different logical switch router; and
   send, by the one or more computer processors, a request to link-up the virtual port channel to a port manager and the universal fiber port for processing.

* * * * *